(12) United States Patent
Enomoto

(10) Patent No.: US 11,704,921 B2
(45) Date of Patent: Jul. 18, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Makoto Enomoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/583,055

(22) Filed: Jan. 24, 2022

(65) Prior Publication Data

US 2022/0245957 A1  Aug. 4, 2022

(30) Foreign Application Priority Data

Jan. 29, 2021  (JP) .................................. 2021-013430

(51) Int. Cl.
*G06V 30/24* (2022.01)
*G06V 30/32* (2022.01)
*G06V 30/41* (2022.01)
*G06V 30/224* (2022.01)

(52) U.S. Cl.
CPC ........ *G06V 30/2552* (2022.01); *G06V 30/224* (2022.01); *G06V 30/32* (2022.01); *G06V 30/41* (2022.01)

(58) Field of Classification Search
CPC .. G06V 30/2552; G06V 30/224; G06V 30/32; G06V 30/41; G06V 30/1448; G06V 30/1452; G06V 30/1918; G06V 30/226; G06V 30/412; G06V 30/153; G06V 30/19113; G06F 18/22; G06N 20/00
See application file for complete search history.

(56) References Cited

U.S. PATENT DOCUMENTS

| 5,237,628 A | 8/1993 | Levitan ......................... 382/175 |
| 5,555,325 A | 9/1996 | Burger .......................... 382/309 |
| 2020/0089945 A1* | 3/2020 | Kitamura ............. G06V 30/412 |
| 2021/0099586 A1* | 4/2021 | Tanaka ............... H04N 1/00331 |

FOREIGN PATENT DOCUMENTS

JP  2015-118488  6/2015

OTHER PUBLICATIONS

Extended European Search Report dated Jun. 13, 2022 in counterpart EP Application No. 22153493.6.

* cited by examiner

*Primary Examiner* — King Y Poon
*Assistant Examiner* — Michael L Burleson
(74) *Attorney, Agent, or Firm* — Venable LLP

(57) ABSTRACT

Character recognition processing suitable to a handwritten character area and a printed character area among character areas in a scanned image of a document is performed. Next, character recognition results for the handwritten character area and character recognition results for the printed character area are integrated and a likelihood indicating a probability of being an extraction target is calculated for a candidate character string that is an extraction candidate among the integrated character recognition results and a character string that is the item value is determined. Then, at the time of the determination, different evaluation indications are used in a case where a character originating from the handwritten character area is included in characters constituting the candidate character string and in a case where such a character is not included.

11 Claims, 9 Drawing Sheets

To ABC Inc. RECEIPT

Date of issue: December 5, 2020

We have duly received the following amount.

Amount  11,286  dol.

To ~301   RECEIPT ~302

304   Date of issue ~303

We have duly received the following amount.

Amount ~305   dol. ~306

ABC Inc. ~315

| To   $8??  RECEIPT ~401    402
                    Date of issue:December 5, 2020
       We have duly received the following amount. ~403
             Amount   11,286    dol. ~404
No.1001 ~405

FIG.4

To  $8??    RECEIPT      602  603  604
   601       Date of issue: December 5, 2020

We have duly received the following amount.

Amount   11,286    dol.  ~605

| RECTANGLE HEIGHT | PENALTY |
|---|---|
| 0-49 | 30 |
| 50-69 | 20 |
| 70-89 | 10 |
| 90-100 | 0 |

FIG.7A

| AMOUNT NOTATION | PENALTY |
|---|---|
| INCLUDED | 0 |
| NOT INCLUDED | 20 |

FIG.7B

| NUMBER OF DIGITS | PENALTY |
|---|---|
| 0 | 80 |
| 1 | 50 |
| 2 | 30 |
| 3 | 20 |
| 4 | 10 |
| 5~ | 0 |

FIG.7C

| CANDIDATE ID | RECOGNIZED CHARACTER STRING | ATTRIBUTE | NUMBER OF DIGITS | RECTANGLE HEIGHT | AMOUNT NOTATION | LIKELIHOOD |
|---|---|---|---|---|---|---|
| 1 | $8 | HANDWRITTEN | 1(50) | - | INCLUDED(0) | 50 |
| 2 | December | HANDWRITTEN | 0(80) | - | NOT INCLUDED(20) | 0 |
| 3 | 5, | HANDWRITTEN | 1(50) | - | NOT INCLUDED(20) | 30 |
| 4 | 2020 | HANDWRITTEN | 4(10) | - | NOT INCLUDED(20) | 70 |
| 5 | 11,286 dol. | HANDWRITTEN | 5(0) | - | INCLUDED(0) | 100 |
| 6 | 1001 | PRINTED | - | 5(20) | NOT INCLUDED(20) | 60 |

FIG.8A

| CANDIDATE ID | RECOGNIZED CHARACTER STRING | RECTANGLE HEIGHT | AMOUNT NOTATION | LIKELIHOOD |
|---|---|---|---|---|
| 1 | $8 | 100(0) | INCLUDED(0) | 100 |
| 2 | December | 70(10) | NOT INCLUDED(20) | 70 |
| 3 | 5, | 70(10) | NOT INCLUDED(20) | 70 |
| 4 | 2020 | 70(10) | NOT INCLUDED(20) | 70 |
| 5 | 11,286 dol. | 80(10) | INCLUDED(0) | 90 |
| 6 | 1001 | 50(20) | NOT INCLUDED(20) | 60 |

FIG.8B

To ABC Inc. RECEIPT

Date of issue: December 1, 2020

We have duly received the following amount.

901 ~ Amount    110,000 dol. ~ 902

Consumption Tax 10,000 dol. ~ 903

FIG.9

IMAGE PROCESSING APPARATUS, IMAGE PROCESSING METHOD, AND STORAGE MEDIUM

BACKGROUND OF THE INVENTION

Field of the Invention

The technique of the present disclosure relates to a technique to extract character information from a document image.

Description of the Related Art

In recent years, reading a character by performing character recognition processing for an image obtained by scanning a document generally called "business form", such as a voucher and a receipt, and extracting an item value (for example, "$1000") corresponding to a specific item (for example, "Amount") have been performed. This technique is generally called key value extraction processing. Japanese Patent Laid-Open No. 2015-118488 has disclosed a technique to specify a necessary item value by using information on the size and thickness of a recognized character string even in a case where it is not possible to recognize the specific item by the character recognition processing.

For example, in a case of a receipt, it is not a few times that the company name or the amount portion is filled in with handwritten characters. In a case where an item value corresponding to, for example, a key item "Amount" is extracted from a scanned image of a receipt including handwritten characters, usually, OCR (Optical Character Recognition) for handwritten character is used. The OCR for handwritten character is an OCR engine specialized in extracting handwritten characters, such as numbers and currency symbols (in the following, described as "numbers and the like"). Here, because of the characteristic of the OCR for handwritten character, there is a case where the portion of handwritten characters other than numbers and the like of the handwritten characters within a scanned image is recognized erroneously as a character string of numbers and the like. For example, there is such a case where alphabet characters written as the company name are recognized erroneously as numbers and the like. Applying the method of Japanese Patent Laid-Open No. 2015-118488 described above to the case such as this will result in that the character string of handwritten characters, not numbers and the like, which is recognized erroneously as a character string of numbers and the like is extracted as the item value corresponding to the specific item "Amount".

SUMMARY OF THE INVENTION

The image processing system according to the present disclosure is an image processing system including: a memory that stores a program; and a processor that executes the program to perform: obtaining, among character areas in a scanned image of the document, a handwritten character area representing handwritten characters and a printed character area representing printed characters; performing first character recognition processing for handwritten character to the handwritten character area; performing second character recognition processing for printed character to the printed character area; integrating character recognition results for the handwritten character area and character recognition results for the printed character area; and determining a character string that is the item value based on results by calculating a likelihood indicating a probability of being an extraction target for a candidate character string that is an extraction candidate among the integrated character recognition results, wherein in the determining, the likelihood is calculated by using different evaluation indications in a case where a character originating from the handwritten character area is included in characters constituting the candidate character string and in a case where such a character is not included.

Further features of the present disclosure will become apparent from the following description of exemplary embodiments with reference to the attached drawings.

BRIEF DESCRIPTION OF THE DRAWINGS

FIG. 3A is a diagram showing an example of a scanned image of a receipt and FIG. 3B and FIG. 3C are diagrams showing results of area separation processing;

FIG. 4 is a diagram showing integrated character recognition results;

FIG. 6 is a diagram showing value candidates detected from the integrated character recognition results;

FIG. 7A to FIG. 7C are each a diagram showing an example of penalty;

FIG. 8A is a diagram showing likelihood calculation results obtained by a method of the present embodiment and FIG. 8B is a diagram showing likelihood calculation results obtained by a conventional method; and FIG. 9 is a diagram showing an example of a scanned image of a receipt.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1A:
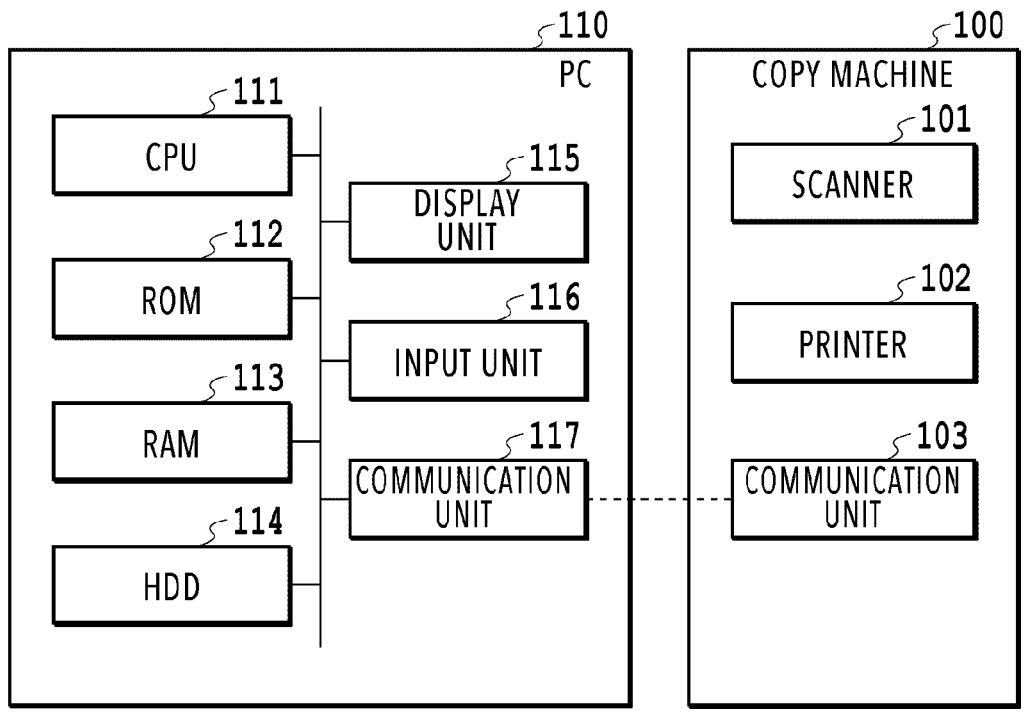
FIG. 1A is a diagram showing an example of a configuration of an image processing system and FIG. 1B is a function block diagram showing a software configuration of a PC.

FIG. 1A is a diagram showing an example of the configuration of an image processing system according to the present embodiment. The image processing system includes a copy machine 100 having a function to scan a document and a PC 110 as an image processing apparatus having a function to perform key value extraction processing for an image obtained by scanning a document (in the following, described as "document image").

The copy machine 100 has a scanner 101, a printer 102, and a communication unit 103. The scanner 101 generates a document image by scanning a document, such as a business form, which is placed on a document table, not shown schematically. The printer 102 forms an image on a printing medium, such as paper, based on the document image. The communication unit 103 performs communication with an external device including the PC 110 via a network. The document image generated by the scanner 101 is transmitted to the PC 110 via the communication unit 103.

The PC 110 has a CPU 111, a ROM 112, a RAM 113, an HDD 114, a display unit 115, an input unit 116, and a communication unit 117. The CPU 111 performs various kinds of processing by reading control programs stored in the ROM 112. The RAM 113 is used as a temporary storage area, such as a maim memory and a work area, of the CPU 111. The HDD 114 stores various kinds of data, various programs and the like. Each function unit of the CPU 110 shown in FIG. 1A, to be described later, is implemented by the CPU 111 reading a predetermined program stored in the ROM 112 or the HDD 114, loading the program onto the RAM 113, and executing the program. The communication unit 117 receives a document image from the copy machine 100 by performing communication with external devices including the copy machine 110 via a network. The display unit 115 is, for example, a liquid crystal display or the like and displays various kinds of information to a user. The input unit 116 is a keyboard, a mouse or the like and receives various operations by a user. The display unit 115 and the input unit 116 may be provided integrally, such as a touch panel. Further, the display unit 115 may be a projector and the input unit 116 in this case may have a configuration in which the position of the fingertip to a projected image is recognized by a camera.

<Outline of Key Value Extraction Processing>

Figure 1B:
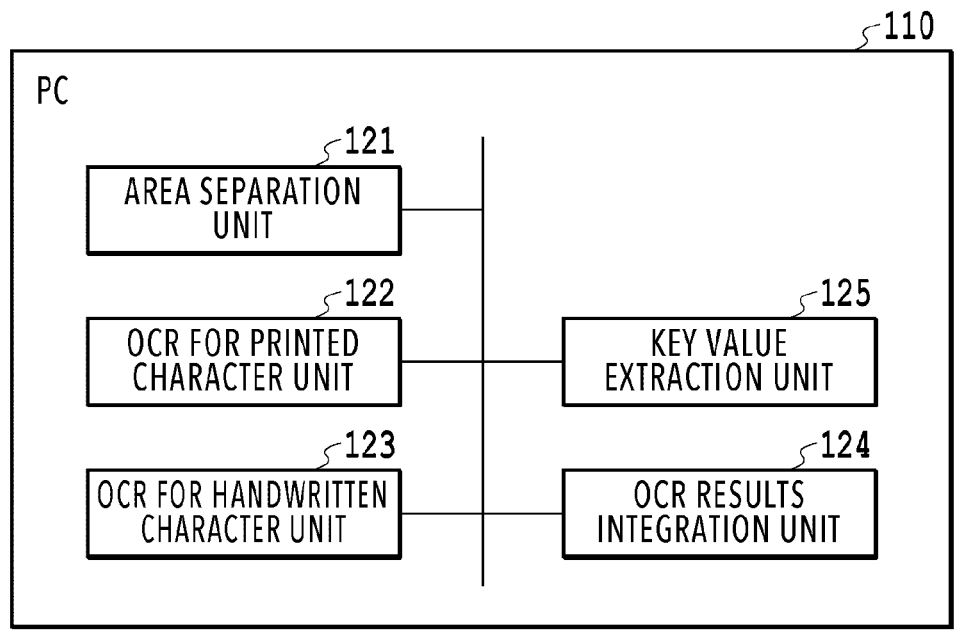
Figure 2:
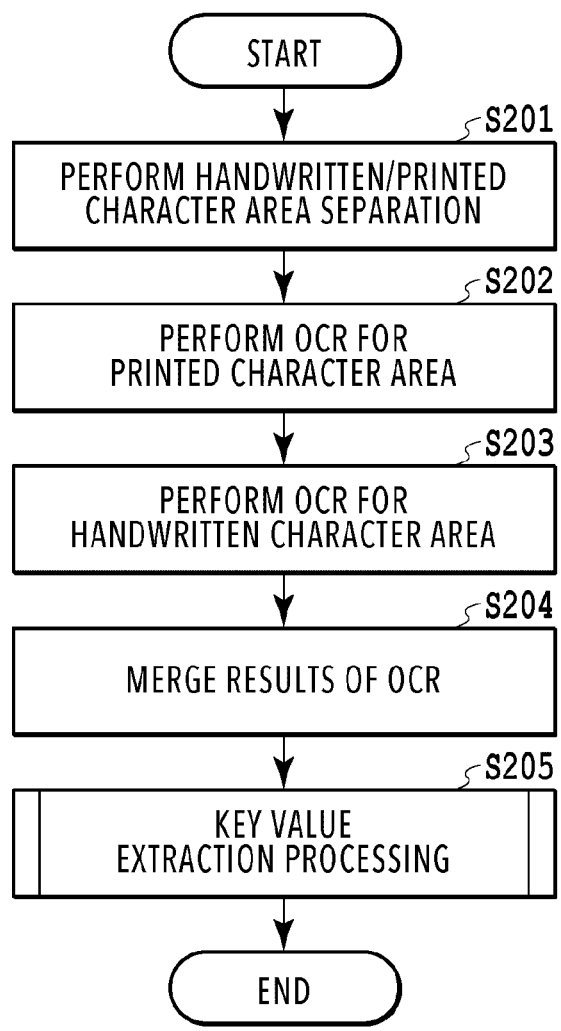
FIG. 2 is a flowchart showing a flow of a series of processing to extract an item value corresponding to a key item from a document image.

FIG. 2 is a flowchart showing a flow of a series of processing to extract an item value corresponding to a predetermined specific item (in the following, called "key item") from a document image in the present embodiment. In the present embodiment, explanation is given with reference to the software function block diagram of the PC 110 shown in FIG. 1B by taking a case as an example where a character string indicating a described value corresponding to a key item "Amount" is extracted as an item value thereof from a document image of a receipt in which a company name and an amount are handwritten. In the following explanation, symbol "S" means a step. Further, the "character string" that is the target to be extracted from a document image includes numbers and symbols.

At S201, an area separation unit 121 performs processing (area separation processing) to separate a handwritten character area and a printed character area and obtain both the areas for a document image of a receipt that is input from the copy machine 100. For the identification between a handwritten character area and a printed character area, it is sufficient to use a publicly known method. For example, there is a method of identifying both areas by finding a separation coefficient of a feature amount for each character or a method of identifying both areas by performing estimation based on results of machine learning of handwritten characters and printed characters (trained model). FIG. 3A is an example of a document image of a receipt in which each character string portion indicating the company name, the date of issue, and the received amount is handwritten and the other portions are printed by printed characters. Then, FIG. 3B and FIG. 3C are results of the area separation processing for the document image in FIG. 3A, and FIG. 3B shows the printed character areas and FIG. 3C shows the handwritten character areas. It may also be possible to further perform processing to identify and separate another area, such as the background other than the character information, an illustration, and a company logo.

At S202, an OCR for printed character unit 122 performs character recognition processing for printed character to the printed character areas obtained by the area separation processing at S201. In a case of printed areas 301 to 307 in FIG. 3B, by the character recognition processing for printed character at this step, character recognition results shown in Table 1 below are obtained.

TABLE 1

| Printed Character Area | Character Recognition Results |
| --- | --- |
| 301 | To |
| 302 | RECEIPT |
| 303 | Date of issue |
| 304 | We have duly received the following amount. |
| 305 | Amount |
| 306 | dol. |
| 307 | No. 1001 |

To the character recognition results shown in Table 1 described above, the character code of each recognized character and coordinate information with which it is possible to specify the size and position of a rectangle indicating the recognition-target printed character area are added. Here, for convenience of explanation, it is assumed that the character recognition results that are all correct have been obtained in the character recognition processing for the printed character areas.

At S203, an OCR for handwritten character unit 123 performs character recognition processing for handwritten character to the handwritten character areas obtained by the area separation processing at S201. In general, the handwritten character has a size different from character to character in many cases and the individual difference due to the personal habit of a writer is large. Because of this, in the character recognition processing for handwritten character, it is difficult to recognize a character compared to the character recognition processing for printed character and there is a tendency for the recognition accuracy of the character recognition processing for handwritten character to be low. Consequently, in order to improve the recognition accuracy, the OCR for written character unit 123 limits the character types that are output as the character recognition results in accordance with the purpose and use. Specifically, in a case where the characters relating to the amount are taken as the recognition target, the character types are limited to Arabic numbers and specific words and symbols. The specific words and symbols in this case include, for example, "month name (for example, January, December and the like)", "$ (currency symbol)", ", (comma)", ". (decimal point, dot)", "- (hyphen)" and the like. As a result of that, character recognition results shown in Table 2 below are obtained by the character recognition processing for handwritten character for handwritten character area 311 to 315 in FIG. 3C.

TABLE 2

| Handwritten Character Area | Character Recognition Results |
| --- | --- |
| 311 | December |
| 312 | 5,. |
| 313 | 2020 |
| 314 | 11,286 |
| 315 | $8?? |

As is obvious from Table 2 described above, for the handwritten character areas 311 to 314, the correct character recognition results are obtained. However, for the handwritten character area 315 in which the company name is written, the characters within the area are not the recognition-target characters, and therefore, the character recognition results, such as "$8??", are obtained in place of the correct character string "ABC Inc.". In this case, "?" indicates that the character recognition has failed. Originally, it is desirable that all the characters that are not the recognition targets are "?", but in the example of Table 2, the alphabet character "A" is erroneously recognized as the dollar symbol "$" and the alphabet character "B" is erroneously recognized as the number "8".

At S204, an OCR results integration unit 124 performs processing to integrate the character recognition results of the printed character area, which are obtained at S202, and the character recognition results of the handwritten character area, which are obtained at S203. In a case where the document relating to the processing-target document image is written horizontally, processing to connect one or a plurality of character areas adjacent in the horizontal direction is performed. FIG. 4 shows the character recognition results of each character area, which are obtained by integrating the character recognition results (see Table 1) of the printed character areas 301 to 307 shown in FIG. 3B and the character recognition results (see Table 2) of the handwritten character areas 311 to 315 shown in FIG. 3C. Here, an integrated character area 401 is obtained by connecting the printed character area 301, the handwritten character area 315 on the right side thereof, and the printed character area 302 on the further right side thereof and the integrated character recognition results are "To $8?? RECEIPT". Similarly, an integrated character area 402 is obtained by connecting the one printed character area 303 and the three handwritten character areas 311, 312, and 313 and the integrated character recognition results are "Date of issue: Dec. 5, 2020". Further, an integrated character area 404 is obtained by connecting the two printed character areas 305 and 306 and the handwritten character area 314 and the integrated character recognition results are "Amount 11, 286 dol.". An integrated character area 403 is the printed character area 304 itself and an integrated character area 405 is also the printed area 307 itself. Then, to each of the integrated character recognition results, attribute information indicating whether the characters constituting each of the integrated character recognition results originate from the area character recognition results of the handwritten character area or originate from the character recognition results of the printed character area is attached.

At S205, a key value extraction unit 125 performs processing to extract a character string as the item value corresponding to the key item from the integrated character recognition results obtained at S204. In the present embodiment, the character string "Amount" in the printed character area 305 is taken as the key item and the character string of the described value corresponding thereto is extracted as the item value thereof. Details of the key value extraction processing will be described later.

The above is the rough flow of the processing to extract the item value corresponding to the key item from the document image. In the flowchart in FIG. 2 described above, the character recognition processing (S202) for the printed character area and the character recognition processing (S203) for the handwritten character area are explained as serial processing, but the processing order is not limited and the processing may be performed in the opposite order or may be performed in parallel.

<Details of Key Value Extraction Unit>

Following the above, processing in the key value extraction unit 125 is explained in detail with reference to the flowchart in FIG. 5 by taking the case of the document image of the receipt shown in FIG. 3A as an example.

First, at S501, from among the integrated character recognition results, the character string of the key item designated in advance is detected. Here, it is possible to detect the character string of the key item by, for example, an ambiguous search using dictionary data. For example, in a case where the character string "Amount" within the receipt is taken as the key item, it may also be possible to give a margin to the detection range so that the detection range includes "Received amount", "Amount" and the like and search these character strings from the integrated character recognition results. Here, the portion of "Amount" of "Amount 11,286 dol.", which is the character recognition results of the character area 404 in FIG. 4, is detected as the character string of the key item. In a case of a receipt including only printed characters, it is frequent that details are described minutely and numbers and the like indicating various amounts are printed. In such a situation, it may happen that it is not possible to specify the character string of the received amount desired to be extracted as the item value even by using the character string "Amount" itself as the key item. Consequently, in a case of a receipt including only printed characters, it is desirable not to perform the above-described ambiguous search and detect the specific character string, such as "Received amount" and "Total amount", as the character string of the key item. Alternatively, in a case where a plurality of character strings of the key item is detected, it may also be possible to weight those character strings and give priority to the character string whose weight is heavy in the stage of the determination of the item value.

Next, at S502, from among the integrated character recognition results, the character string (candidate character string) that is the item value extraction candidate is detected. In the following explanation, this candidate character string is called "value candidate". It is possible to detect the value candidate by pattern matching, such as regular expression. At this time, in view of the possibility of erroneous recognition particularly in the character recognition processing for handwritten character (S203), it is desirable to set a rather lenient pattern restriction and detect value candidates as much as possible. It is sufficient to set the pattern restriction in the detection of the value candidate in a case where the character string "Amount" is taken as the key item, for example, as "$? [0-9. ,] {1, 10} dol.?" (for explanation, escape character is omitted). In the case of this pattern restriction, the character string is the search target, which starts with no character or one character "$ (dollar symbol)" and zero to ten Arabic numbers, ". (dot)", and ", (comma)" follow, and which ends finally with no word or one word "dol.". Due to this, the character string including numbers, which has a possibility of indicating an amount, such as "$1,000", "50 dol.", and "10.0", is detected as the value candidate. FIG. 6 shows a value candidate detected from the integrated character recognition results in FIG. 4. In FIG. 6, a value candidate 601 is a character string obtained by extracting the portion of "$8" of the character recognition results "To $8?? RECEIPT" of the integrated character area 401. Further, value candidates 602, 603, and 604 are character strings obtained by extracting the portions of "December", "5,", and "2020" from the character recognition results. "Date of issue:Dec. 5, 2020" of the integrated character area 402. Similarly, a value candidate 605 is a character string obtained by extracting the portion of "11, 286 dol." from the character recognition results "Amount 11,286 dol." of the integrated character area 404. Then, a value candidate 606 is a character string obtained by extracting the portion of "1001" from the character recognition results "No. 1001" of the integrated character area 405. For each value candidate detected from the integrated character recognition results in this manner, the probability that each value candidate is the item value of "Amount", which is the key item, is evaluated at the subsequent steps and the value candidate whose probability is evaluated to be the highest is determined finally as the item value.

At S503, whether or not a handwritten character is included is determined based on the attribute information described previously for the value candidate of interest among all the value candidates detected at S502 and the processing is branched in accordance with the determination results. In a case where a handwritten character is included in the value candidate of interest, the processing advances to S505 and in a case where no handwritten character is included (that is, the value candidate of interest consists of only printed characters), the processing advances to S504.

At S504, a likelihood that is a degree indicating a probability of being an item value is calculated by using an evaluation indication for printed character for the value candidate of interest consisting of only printed characters. In the present embodiment, the likelihood is found by the demerit system with penalty for the evaluation indication by taking a score of 100 as a perfect score and the value candidate whose likelihood is the strongest is determined to be the item value. Here, the evaluation indication and the penalty depend on the type of the processing-target document and the feature of the item value desired to be extracted. Here, the processing target is the receipt and the key item is "Amount", and therefore, the more proper the character string is as the representation format of amount, the lower the penalty is given. In a case of printed characters, the character size is constant in each character area, but the possibility is strong that the character size of the printed character portion representing the received amount is large among the printed characters printed in advance within the receipt. Consequently, the height of the character area of the value candidate (rectangle height) is taken as the evaluation indication and the larger the character size, the lower the penalty is given and the less the height of the character area (rectangle height), the higher the penalty is given. FIG. 7A is a table that puts together the penalties in accordance with the rectangle height and the different penalty is given stepwise in accordance with the predetermined rectangle height. Here, the rectangle height is a relative value to the greatest rectangle height (corresponding to the row height because of horizontal writing) within the document image and the rectangle height is represented by an integer value with the greatest rectangle height being taken as "100". FIG. 7B is a table indicating the penalty in a case where whether or not the amount notation exists in the value candidate is taken as the evaluation indication. In a case where the amount notation, such as "$" and "dol.", exists, the penalty is "0 (none)" and in a case where it does not exist, the penalty is "20". The evaluation indications and the penalties shown in FIG. 7A and FIG. 7B are merely examples and they are not limited to those.

At S505, for the value candidate of interest including a handwritten character, the above-described likelihood is calculated by using the evaluation indication for handwritten character. Here, the character size, which is the evaluation indication for printed character, is not used as the evaluation indication for handwritten character. In place of that, the number of digits of the number constituting the character string of the value candidate is used as the evaluation indication. In a case of handwritten characters, the character size is not constant in many cases. Further, as described previously, in the character recognition processing by the OCR for handwritten character unit 123, the target character types are limited and it is expected to a certain extent that there is a possibility of a character that is not a number originally being recognized erroneously. Because of this, the number of digits of the number is used as the evaluation indication in place of the character size. Then, the reason the larger the number of digits, the lower the penalty is given is that it is considered that the probability of erroneously recognizing characters that are not numbers as numbers successively is low and the smaller the number of digits, the higher the probability of erroneous recognition is.

At S506, whether or not the above-describe likelihood calculation processing is completed for all the value candidates detected at S502 is determined and the processing is branched in accordance with the determination results. In a case where the calculation of the likelihood is completed for all the value candidates, the processing advances to S507 and in a case where there is an unprocessed value candidate, the processing returns to S503, and the next value candidate of interest is determined and the processing is continued. FIG. 8A is a table that puts together the results of the likelihood calculation for the six value candidates shown in FIG. 6. FIG. 8A is the tale showing the likelihood calculation results obtained by the method of the present embodiment. In the table in FIG. 8A, in a "Candidate ID" column, an ID identifying a value candidate is input. In a "Recognized Character String" column, information on the character string relating to the value candidate is input. Then, in an "Attribute" column, information indicating whether a handwritten character is included in the character string of the value candidate or all characters are printed characters is input. In a "Number of Digits" column, the value obtained by counting the number of characters in a case where a number exists within the character string of the value candidate is input and the penalty in accordance with the count value is indicated within the brackets. In a "Rectangle Height" column, the value of the height of the character area in a case where the character string of the value candidate has the printed character attribute and the penalty due to that is indicated within the brackets. In an "Amount Notation" column, information indicating whether or not an amount notation exists in the character string of the value candidate is input and the penalty due to that is indicated within brackets. Then, in a "Likelihood" column at the leftmost end, a value obtained by subtracting the total of penalty from 100 is input. The calculation processing of the likelihood of the value candidates 601 to 606 by the method of the present embodiment is described in detail as follows.

Value candidate 601: the character string including a handwritten character and the number is only "8" and the number of digits is "1", and therefore, the penalty due to the number of digits is "50" and "$" is included, and therefore, the penalty due to the amount notation is "0". Consequently, the likelihood is "50".

Value candidate 602: the character string including handwritten characters and the number of digits is "0", and therefore, the penalty due to the number digits is "80" and "¥" or the like is not included, and therefore, the penalty due to the amount notation is "20". Consequently, the likelihood is "0".

Value candidate 603: the character string including a handwritten character and the number of digits is "1", and therefore, the penalty due to the number of digits is "50" and "$" or the like is not included, and therefore, the penalty due to the amount notation is "20". Consequently, the likelihood is "30".

Value candidate 604: the character string including a handwritten character and the number of digits is "4", and therefore, the penalty due to the number of digits is "10" and "$" or the like is not included, and therefore, the penalty due to the amount notation is "20". Consequently, the likelihood is "70".

Value candidate 605: the character string including a handwritten character and the number of digits is "5", and therefore, the penalty due to the number of digits is "0" and "dol." is included, and therefore, the penalty due to the amount notation is "0". Consequently, the likelihood is "100".

Value candidate 606: the character string including no handwritten character (consisting of only printed characters) and the rectangle height is "50", and therefore, the penalty due to the rectangle height is "20" and "$" or the like is not included, and therefore, the penalty due to the amount notation is "20". Consequently, the likelihood is "60".

From the "Likelihood" column in the table in FIG. 8A, it is seen that the likelihood of "11,286 dol." of the value candidate 604 is the strongest. In FIG. 8B, for comparison, a table that puts together the likelihood calculation results obtained by the conventional method is shown for comparison. In a case of the conventional method in which as the evaluation indication common to the handwritten character and the printed character, the rectangle height and the presence/absence of the amount notation are applied, it is seen that the likelihood of the value candidate "$8" is the strongest. The calculation process of the likelihood of each value candidate by the conventional method is described in detail as follows.

Candidate ID_1: the rectangle height is "100", and therefore, the penalty due to the rectangle height is "0" and "$" is included, and therefore, the penalty due to the amount notation is "0". Consequently, the likelihood is "100".

Candidate ID_2: the rectangle height is "70", and therefore, the penalty due to the rectangle height is "10" and "$" or the like is not included, and therefore, the penalty due to the amount notation is "20". Consequently, the likelihood is "70".

Candidate ID_3: the rectangle height is "70", and therefore, the penalty due to the rectangle height is "10" and "$" or the like is not included, and therefore, the penalty due to the amount notation is "20". Consequently, the likelihood is "70".

Candidate ID_4: the rectangle height is "70", and therefore, the penalty due to the rectangle height is "10" and "$" or the like is not included, and therefore, the penalty due to the amount notation is "20". Consequently, the likelihood is "70".

Candidate ID_5: the rectangle height is "80", and therefore, the penalty due to the rectangle height is "10" and "dol." is included, and therefore, the penalty due to the amount notation is "0". Consequently, the likelihood is "90".

Candidate ID_6: the rectangle height is "50", and therefore, the penalty due to the rectangle height is "20" and "$" or the like is not included, and therefore, the penalty due to the amount notation is "20". Consequently, the likelihood is "60".

Figure 5:
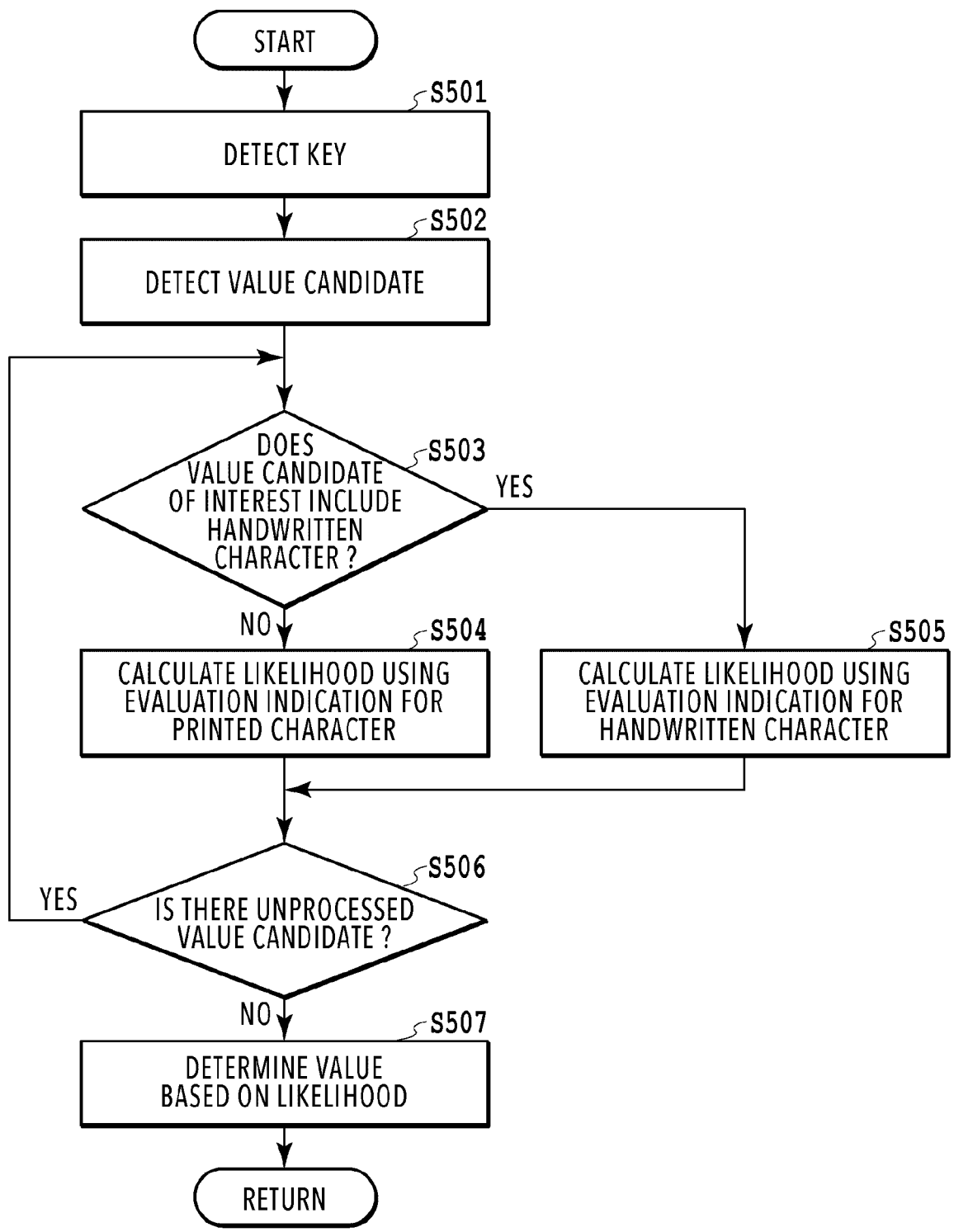
FIG. 5 is a flowchart showing details of key value extraction processing.

Explanation is returned to the flow in FIG. 5.

At S507, among all the value candidates detected at S502, the value candidate whose likelihood calculated at S504 or S505 is the strongest is determined to be the character string of the item value corresponding to the predetermined key item. In the case of the example in FIG. 6, as described previously, the value candidate "11,286 dol." whose likelihood is the strongest is determined to be the item value. Then, the value candidate "11,286 dol." is the character string indicating the received amount described in the amount field of the receipt shown in FIG. 3A, and there, it is meant that the correct item value has been extracted.

The above is the contents of the key value extraction processing according to the present embodiment. The likelihood calculation method explained at S504 and S505 is an example and for example, it may also be possible to calculate the likelihood by the point addition system. Further, in the present embodiment, one value candidate whose likelihood is the strongest is determined to be the item value, but it may also be possible to determine all the value candidates whose likelihood is stronger than or equal to a predetermined value to be the item values. Furthermore, it may also be possible to increase the kinds of evaluation indication. For example, in a case where the received amount in the receipt is taken as the key item, it can be said that the attribute of handwriting itself represents a high probability of being the item value. Consequently, it may also be possible to give penalty uniformly to the detected value candidates having the printed character attribute. Due to this, in a case where both the handwritten amount and the printed character amount are obtained as the value candidates, it is possible to preferentially determine the handwritten amount to be the item value.

Modification Example

In the above-described embodiment, the item value is determined based on only the likelihood calculated for the value candidate, but it may also be possible to determine the item value by further taking into consideration information relating to the key item. In the following, an aspect is explained as a modification example in which the item value is determined by taking into consideration the position relationship between each value candidate and the character area of the character string of the key item, in addition to the likelihood of the value candidate.

FIG. 9 is an example of a document image of a receipt adaptive to the present modification example. First, by the processing at S501 described previously for the document image shown in FIG. 9, "Amount" in a character area 901 is detected as the character string of the key item. Then, in the loop processing at S502 to S506 described previously, "110,000 dol." in a character area 902 and "10,000 dol." in a character area 903 are detected as value candidates and both have the number of digits larger than or equal to five and include the amount notation, and therefore, the same likelihood is obtained for both. In a case where there is no difference in likelihood among a plurality of value candidates as described above, the item value is determined by referring to the position relationship between each value candidate and the character areas of the character string of the key item. Specifically, in the processing at S507, the coordinate information on the character area 901 of "Amount", which is the character string of the key detected at S501, is obtained and "110,000 dol." in the character area 902 whose position coordinates in the y-direction are the same is determined to be the item value. In this case, the position coordinate in the y-direction do not need to match perfectly and need only to match approximately. According to this modification example, even in a case where it is difficult to narrow the value candidates by the likelihood alone, it is made possible to appropriately determine the character string of the item value from a plurality of value candidates based on the position relationship between each value candidate and the character string of the key item.

As explained above, according to the present embodiment, even from a document image, such as a receipt in which there is a case where numbers and the like are handwritten, it is possible to extract a character string, such as handwritten number and the like, with a high accuracy as the item value corresponding to a specific key item.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even from a document image, such as a receipt in which there is a case where part of characters are handwritten, it is possible to appropriately extract desired handwritten characters as the item value corresponding to a specific item.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-013430, filed Jan. 29, 2021 which is hereby incorporated by reference wherein in its entirety.

What is claimed is:

1. An image processing apparatus for extracting a character string that is to be an item value corresponding to a specific item among character strings described in a document, the image processing apparatus comprising:
a memory that stores a program; and
a processor that executes the program to perform:
obtaining, among character areas in a scanned image of the document, a handwritten character area representing handwritten characters and a printed character area representing printed characters;
performing first character recognition processing for handwritten character to the handwritten character area;
performing second character recognition processing for printed character to the printed character area;
integrating character recognition results for the handwritten character area and character recognition results for the printed character area; and
determining a character string that is the item value based on results by calculating a likelihood indicating a probability of being an extraction target for a candidate character string that is an extraction candidate among the integrated character recognition results, wherein
in the determining, the likelihood is calculated by using different evaluation indications in a case where a character originating from the handwritten character area is included in characters constituting the candidate character string and in a case where such a character is not included.

2. The image processing apparatus according to claim 1, wherein
in the determining, in a case where a number is included in characters constituting the candidate character string:
on a condition that a character originating from the handwritten character area is included, a number of digits of the number is used as the evaluation indication; and
on a condition that a character originating from the handwritten character area is not included, a character size of the number is used as the evaluation indication.

3. The image processing apparatus according to claim 2, wherein
in the determining, in a case where the specific item is an item relating to an amount, calculation of the likelihood is performed so that the larger the number of digits of the number or the larger the character size, the stronger the likelihood is obtained.

4. The image processing apparatus according to claim 1, wherein
the specific item is an item relating to an amount,
the character recognition processing for handwritten character is character recognition processing that limits recognition-target character types to predetermined notations including at least a number and a currency symbol, and
in the determining, the presence/absence of a character indicating the predetermined notation is further used as the evaluation indication.

5. The image processing apparatus according to claim 4, wherein
in the determining, calculation of the likelihood is performed so that a stronger likelihood is obtained in a case where there is a character indicating the predetermined notation than in a case where there is not such a character.

6. The image processing apparatus according to claim 1, wherein
in the determining, whether or not a character constituting the candidate character string originates from the handwritten character area is further used as the evaluation indication.

7. The image processing apparatus according to claim 6, wherein
in the determining, calculation of the likelihood is performed so that a stronger likelihood is obtained in a case where a character constituting the candidate character string originates from the handwritten character area than in a case where the character does not originate from the handwritten character area.

8. The image processing apparatus according to claim 1, wherein
in the determining, in a case where there is no difference in likelihood calculated for a plurality of candidate character strings, a character string that is to be the item value is determined based on a position relationship between each candidate character string and the character string of the specific item.

9. The image processing apparatus according to claim 1, wherein
the document is a receipt.

10. An image processing method for extracting a character string that is to be an item value corresponding to a specific item among character strings described in a document, the image processing method comprising the steps of:
obtaining, among character areas in a scanned image of the document, a handwritten character area representing handwritten characters and a printed character area representing printed characters;
performing character recognition processing for handwritten character to the handwritten character area;
performing character recognition processing for printed character to the printed character area;
an integration step of integrating character recognition results for the handwritten character area and character recognition results for the printed character area; and
determining a character string that is the item value based on results by calculating a likelihood indicating a probability of being an extraction target for a candidate character string that is an extraction candidate among the integrated character recognition results, wherein
at the determination step, the likelihood is calculated by using different evaluation indications in a case where a character originating from the handwritten character area is included in characters constituting the candidate character string and in a case where such a character is not included.

11. A non-transitory computer readable storage medium storing a program for causing a computer to perform an image processing method for extracting a character string that is to be an item value corresponding to a specific item among character strings described in a document, the image processing method comprising the steps of:
obtaining, among character areas in a scanned image of the document, a handwritten character area representing handwritten characters and a printed character area representing printed characters;
performing character recognition processing for handwritten character to the handwritten character area;
performing character recognition processing for printed character to the printed character area;
an integration step of integrating character recognition results for the handwritten character area and character recognition results for the printed character area; and
determining a character string that is the item value based on results by calculating a likelihood indicating a probability of being an extraction target for a candidate character string that is an extraction candidate among the integrated character recognition results, wherein
at the determination step, the likelihood is calculated by using different evaluation indications in a case where a character originating from the handwritten character area is included in characters constituting the candidate character string and in a case where such a character is not included.

* * * * *